(12) United States Patent
Mizawa et al.

(10) Patent No.: US 10,256,461 B2
(45) Date of Patent: *Apr. 9, 2019

(54) NONAQUEOUS ELECTROLYTE SECONDARY BATTERY AND POSITIVE ELECTRODE ACTIVE MATERIAL FOR NONAQUEOUS ELECTROLYTE SECONDARY BATTERIES

(71) Applicant: SANYO Electric Co., Ltd., Daito-shi, Osaka (JP)

(72) Inventors: Atsushi Mizawa, Hyogo (JP); Fumiharu Niina, Hyogo (JP); Daisuke Nishide, Hyogo (JP); Hiroyuki Fujimoto, Hyogo (JP); Yoshinori Kida, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 244 days.

This patent is subject to a terminal disclaimer.

(21) Appl. No.: 14/424,304

(22) PCT Filed: Aug. 29, 2013

(86) PCT No.: PCT/JP2013/005099
§ 371 (c)(1),
(2) Date: Feb. 26, 2015

(87) PCT Pub. No.: WO2014/049964
PCT Pub. Date: Apr. 3, 2014

(65) Prior Publication Data
US 2015/0221933 A1    Aug. 6, 2015

(30) Foreign Application Priority Data

Sep. 25, 2012 (JP) .................................. 2012-211204
Jan. 28, 2013 (JP) .................................. 2013-013408

(51) Int. Cl.
*H01M 4/36* (2006.01)
*H01M 4/525* (2010.01)
(Continued)

(52) U.S. Cl.
CPC ............ *H01M 4/364* (2013.01); *C01G 33/00* (2013.01); *C01G 53/50* (2013.01); *H01M 4/131* (2013.01);
(Continued)

(58) Field of Classification Search
None
See application file for complete search history.

(56) References Cited

U.S. PATENT DOCUMENTS

2006/0046143 A1    3/2006  Nakai et al.
2007/0141470 A1*   6/2007  Nakura ................. H01M 4/131
                                                          429/231.3

(Continued)

FOREIGN PATENT DOCUMENTS

JP    2006-302880 A    11/2006
JP    2009-140787 A     6/2009
(Continued)

OTHER PUBLICATIONS

International Search Report dated Dec. 10, 2013, issued in corresponding application No. PCT/JP2013/005099.
(Continued)

*Primary Examiner* — Wojciech Haske
(74) *Attorney, Agent, or Firm* — Westerman, Hattori, Daniels & Adrian, LLP

(57) ABSTRACT

A nonaqueous electrolyte secondary battery of the invention includes a positive electrode, a negative electrode and a nonaqueous electrolyte, the positive electrode including lithium transition metal oxide particles as a positive electrode active material, the lithium transition metal oxide
(Continued)

particles containing nickel as a main transition metal component and being such that a first compound containing at least one element Ma selected from the group consisting of Group IV elements and Group V elements is sintered to a portion of the surface of the lithium transition metal oxide particles, the first compound having a composition different from that of the lithium transition metal oxide particles, the positive electrode further including a second compound containing at least one element Mb selected from the group consisting of Group VI elements, the second compound having a composition different from that of the lithium transition metal oxide particles.

12 Claims, 3 Drawing Sheets

(51) Int. Cl.
*H01M 4/131* (2010.01)
*C01G 53/00* (2006.01)
*C01G 33/00* (2006.01)
H01M 4/505 (2010.01)
H01M 4/02 (2006.01)

(52) U.S. Cl.
CPC ......... *H01M 4/525* (2013.01); *C01P 2002/72* (2013.01); *C01P 2004/03* (2013.01); *C01P 2006/40* (2013.01); *H01M 4/505* (2013.01); *H01M 2004/028* (2013.01)

(56) References Cited

U.S. PATENT DOCUMENTS

| 2008/0090150 | A1  | 4/2008  | Nakura |
| 2009/0087739 | A1* | 4/2009  | Takahashi ............. H01M 4/131 429/188 |
| 2009/0305136 | A1* | 12/2009 | Yada ................... H01M 4/0471 429/223 |
| 2011/0195309 | A1  | 8/2011  | Nina et al. |
| 2011/0315918 | A1* | 12/2011 | Kawai .................. H01M 4/505 252/182.1 |
| 2012/0077082 | A1* | 3/2012  | Se-Hee ................ H01M 4/485 429/209 |

FOREIGN PATENT DOCUMENTS

| JP | 2011-70789 A   | 4/2011 |
| JP | 2011-181386 A  | 9/2011 |
| JP | 2011-187435 A  | 9/2011 |
| JP | 2012-33389 A   | 2/2012 |
| JP | 2012-138352 A  | 7/2012 |

OTHER PUBLICATIONS

Office Action dated Jan. 17, 2018, issued in U.S. Appl. No. 14/131,771 (7 pages).

* cited by examiner

NONAQUEOUS ELECTROLYTE SECONDARY BATTERY AND POSITIVE ELECTRODE ACTIVE MATERIAL FOR NONAQUEOUS ELECTROLYTE SECONDARY BATTERIES

TECHNICAL FIELD

The present invention relates to a nonaqueous electrolyte secondary battery and a positive electrode active material for nonaqueous electrolyte secondary batteries.

BACKGROUND ART

In recent years, electric vehicles such as hybrid electric vehicles that use a combination of an automobile gasoline engine and an electric motor have been progressively developed in order to address environmental problems associated with vehicle emissions.

While in general nickel-hydrogen storage batteries are widely used as the power sources in such electric vehicles, the use of nonaqueous electrolyte secondary batteries is studied to realize power sources having higher capacity and higher output.

In conventional nonaqueous electrolyte secondary batteries, lithium transition metal oxides containing nickel as the main transition metal component are used in positive electrode active materials. However, problems remain in terms of output characteristics and thermal stability.

Patent Literature 1 proposes that a niobium compound is sintered on the surface of a positive electrode active material to enhance output characteristics.

Patent Literature 2 proposes that the surface of a positive electrode active material layer has a nickel oxide containing at least one element selected from the group consisting of aluminum, manganese, magnesium, boron, zirconium, tungsten, niobium, tantalum, indium, molybdenum and tin.

CITATION LIST

Patent Literature

PTL 1: Japanese Published Unexamined Patent Application No. 2011-187435
PTL 2: Japanese Published Unexamined Patent Application No. 2006-302880

SUMMARY OF INVENTION

Technical Problem

However, the techniques disclosed in Patent Literature 1 and Patent Literature 2 cannot sufficiently enhance output characteristics at low temperatures.

An object of the present invention is to provide a nonaqueous electrolyte secondary battery and a positive electrode active material for nonaqueous electrolyte secondary batteries which may achieve enhanced output characteristics under low-temperature conditions.

Solution to Problem

A nonaqueous electrolyte secondary battery according to the present invention includes a positive electrode, a negative electrode and a nonaqueous electrolyte, the positive electrode including lithium transition metal oxide particles as a positive electrode active material, the lithium transition metal oxide particles containing nickel as a main transition metal component and being such that a first compound containing at least one element Ma selected from the group consisting of Group IV elements and Group V elements is sintered to a portion of the surface of the lithium transition metal oxide particles, the first compound having a composition different from that of the lithium transition metal oxide particles, the positive electrode further including a second compound containing at least one element Mb selected from the group consisting of Group VI elements, the second compound having a composition different from that of the lithium transition metal oxide particles.

A positive electrode active material for nonaqueous electrolyte secondary batteries according to the present invention includes lithium transition metal oxide particles containing nickel as a main transition metal component, a first compound having a composition different from that of the lithium transition metal oxide particles and being sintered to a portion of the surface of the lithium transition metal oxide particles, and a second compound having a composition different from that of the lithium transition metal oxide particles and being attached to a portion of the surface of the lithium transition metal oxide particles, the first compound containing at least one element Ma selected from the group consisting of Group IV elements and Group V elements, the second compound containing at least one element Mb selected from the group consisting of Group VI elements.

Advantageous Effects of Invention

According to the present invention, output characteristics under low-temperature conditions may be enhanced.

DESCRIPTION OF EMBODIMENTS

Figure 1:
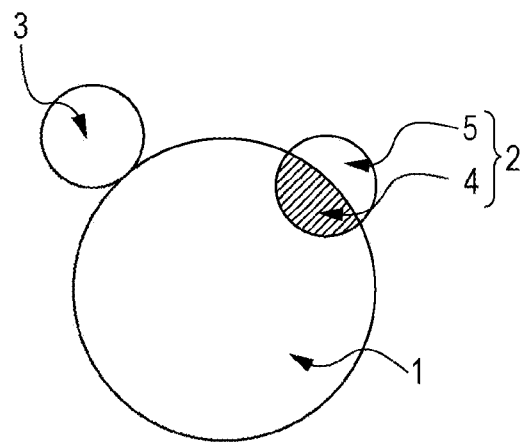
FIG. 1 is a schematic view illustrating a lithium transition metal oxide particle in Examples of the present invention in which a first compound is sintered to the surface of the particle and a second compound is attached to the surface of the positive electrode active material.

In the invention, a first compound is sintered to a portion of the surface of lithium transition metal oxide particles. The first compound has a composition different from that of the lithium transition metal oxide particles, and contains at least one element Ma selected from the group consisting of Group IV elements and Group V elements. As a result of the first compound being sintered to the surface of the lithium transition metal oxide particles, the first compound is bonded to the surface while forming a solid solution with the lithium transition metal oxide particles. This modification allows the lithium transition metal oxide particles to form an enhanced interface with a nonaqueous electrolyte.

A second compound is attached to a portion of the surface of the lithium transition metal oxide particles. The second compound has a composition different from that of the lithium transition metal oxide particles, and contains at least one element Mb selected from the group consisting of Group VI elements.

The second compound reacts with a lithium compound (a resistance component) present on the surface of the lithium transition metal oxide particles to significantly reduce the reaction resistance at the surface of the lithium transition metal oxide particles.

Because of the first compound being sintered to a portion of the surface of the lithium transition metal oxide particles and the second compound being attached to a portion of the surface of the lithium transition metal oxide particles, the positive electrode active material is allowed to form an enhanced interface with a nonaqueous electrolyte and further the reaction resistance at the surface of the lithium transition metal oxide particles is significantly reduced to promote the charge transfer reaction at the interface between the positive electrode active material and the nonaqueous electrolyte. As a result, output characteristics under low-temperature conditions may be enhanced.

Examples of the elements Ma in the first compounds include titanium (Ti), zirconium (Zr), hafnium (Hf), vanadium (V), niobium (Nb) and tantalum (Ta). Of these, niobium, zirconium and titanium are particularly preferable because the compound containing any of niobium, zirconium and titanium as the element Ma may be easily diffused into the surface of the lithium transition metal oxide particles and hence may be effectively sintered to realize a decrease in reaction resistance.

Examples of the elements Mb in the second compounds include chromium (Cr), molybdenum (Mo) and tungsten (W). Of these, tungsten and molybdenum are particularly preferable because the compound containing any of tungsten and molybdenum as the element Mb exhibits high reactivity with respect to a residual lithium compound (a resistance component) present on the surface of the lithium transition metal oxide particles. That is, it is considered that such a resistance component may be removed effectively and consequently output characteristics may be enhanced.

The first compound is bonded to the lithium transition metal oxide particles by being sintered to a portion of the surface of the particles. This sintering may be effected by performing heat treatment while particles of a precursor compound of the first compound are in contact with a portion of the surface of the lithium transition metal oxide particles. When, for example, the first compound is a niobium compound, the lithium transition metal oxide particles and the niobium compound form compounds such as a Li—Nb—O compound and a Li—Ni—Nb—O compound.

As illustrated in FIG. 1, a first compound 2 is bonded to a portion of the surface of a lithium transition metal oxide particle 1 by being sintered thereto. The first compound 2 has a surface solid solution portion 4 that is formed by the dissolution between the compound and the lithium transition metal oxide particle 1. The first compound may have a particle surface portion 5 that is not dissolved in the lithium transition metal oxide particle 1.

The second compound is attached to a portion of the surface of the lithium transition metal oxide particles. As used herein, the term "attached" means that the second compound is simply in contact with a portion of the surface of the lithium transition metal oxide particles. This attachment may be obtained simply by uniformly mixing the lithium transition metal oxide particles and the second compound. Thus, the second compound is not dissolved in the surface of the lithium transition metal oxide particles in contrast to the first compound. That is, the constituent element Mb of the second compound is not diffused into the lithium transition metal oxide particles.

As illustrated in FIG. 1, a second compound 3 is attached to a portion of the surface of the lithium transition metal oxide particle 1. Unlike the first compound 2, the second compound does not have a surface solid solution portion 4.

Although detailed reasons are not clear, sintering the second compound to the surface of the lithium transition metal oxide particles instead of the first compound results in a failure to achieve effects of enhancing output characteristics because a lithium compound that is a resistance component is reformed on the surface of the lithium transition metal oxide particles by the heating and also because such a modification does not enhance the interface between the positive electrode active material and a nonaqueous electrolyte.

If the first compound is attached instead of the second compound, the reaction resistance cannot be decreased because of the inability of the first compound to react with a residual lithium compound (a resistance component) present on the surface of the lithium transition metal oxide particles. As a result, no effects are obtained in the enhancement in output characteristics.

The advantageous effects of the present invention are obtained probably for the following reason. The modification by the sintering of the first compound enhances the interface between the positive electrode active material and a nonaqueous electrolyte. During the calcination for the sintering of the first compound, a lithium compound (a resistance component) is formed on the surface of the modified particles. According to the invention, the lithium compound (the resistance component) present on the surface of the sintered particles may be removed by the action of the second compound attached to the surface. This is probably the reason why output characteristics are enhanced.

The sintering of the first compound may be confirmed by identifying the presence of the element Ma near the surface of the lithium transition metal oxide particles by a method such as element mapping with an EPMA. Alternatively, as will be described later, the sintering may be confirmed by X-ray diffractometry to detect a compound that results from the dissolution of the first compound into the surface of the lithium transition metal oxide particles.

The lithium transition metal oxide particles are not particularly limited as long as nickel is the main transition metal component. With this configuration, high output and high capacity may be realized. The phrase that nickel is the main transition metal component means that nickel has the largest proportion (the largest number of moles) among the transition metals present in the lithium transition metal oxide particles.

If the lithium transition metal oxide particles are such that the main transition metal component is other than nickel, for example, if the lithium transition metal oxide particles are $LiCoO_2$, $LiFePO_4$, $LiMn_2O_4$, $LiNi_{0.4}Co_{0.6}O_2$ or $LiNi_{0.4}Mn_{0.6}O_2$, such a positive electrode active material cannot achieve enhanced output characteristics even by the attachment of the second compound (an oxide containing at least one element Mb selected from the group consisting of Group VI elements) to a portion of the surface of the lithium transition metal oxide particles. The reason for this failure is because there is substantially no residual lithium compound on the surface.

As will be described later, the transition metals preferably include manganese and/or cobalt in addition to nickel from the viewpoint of the enhancement in output characteristics (low-temperature output characteristics) by the sintering of the first compound and the attachment of the second compound. Advantageously, the enhancement in output characteristics is maximized when the transition metals include both manganese and cobalt.

Further, the lithium transition metal oxide particles are preferably an oxide represented by the general formula $Li_{1+x}Ni_aMn_bCo_cO_{2+d}$ (wherein x, a, b, c and d satisfy $x+a+b+c=1$, $0<x\leq0.2$, $a\geq b$, $a\geq c$, $0<c/(a+b)<0.65$, $1.0\leq a/b\leq3.0$ and $-0.1\leq d\leq0.1$).

In the lithium nickel cobalt manganate represented by the above general formula, the compositional ratio c of cobalt, the compositional ratio a of nickel and the compositional ratio b of manganese satisfy $0<c/(a+b)<0.65$. The reason for the use of such an oxide is to decrease the proportion of cobalt and to reduce the cost of raw materials for the positive electrode active material.

In the lithium nickel cobalt manganate represented by the above general formula, the compositional ratio a of nickel and the compositional ratio b of manganese satisfy $1.0\leq a/b\leq3.0$. If the proportion of nickel is increased and the value of a/b exceeds 3.0, the lithium nickel cobalt manganate becomes thermally instable and thus the peak exothermic temperature is lowered. This causes disadvantages in designing batteries while ensuring safety. On the other hand, an increase in the proportion of manganese to an a/b value of less than 1.0 tends to result in the formation of an impurity layer, causing a decrease in capacity. In light of these disadvantages, it is preferable that the oxide satisfy $1.0\leq a/b\leq2.0$, and in particular $1.0\leq a/b\leq1.8$.

In the lithium nickel cobalt manganate represented by the above general formula, x in (1+x) which is the compositional ratio of lithium satisfies $0<x\leq0.2$. The satisfaction of $0<x$ enhances output characteristics. If, on the other hand, x exceeds 0.2, the amount of the alkali component remaining on the surface of the lithium nickel cobalt manganate is increased to facilitate the gelation of a slurry during battery fabrication steps. Further, such an excessively large proportion of lithium correspondingly decreases the amounts of the transition metals responsible for the redox reaction, resulting in a decrease in positive electrode capacity. In light of these disadvantages, it is preferable that the oxide satisfy $0.05\leq x\leq0.15$, and in particular $0.07\leq x\leq0.15$.

In the lithium nickel cobalt manganate represented by the above general formula, d in (2+d) which is the compositional ratio of oxygen satisfies $-0.1\leq d\leq0.1$. The satisfaction of this condition prevents a defect in the crystal structure of the lithium nickel cobalt manganate due to the lack or excess of oxygen.

The first compound that is sintered to the surface of the lithium transition metal oxide particles contains at least one element Ma selected from the group consisting of Group IV elements and Group V elements. This configuration is advantageous in that the sintering of such a compound to the lithium transition metal oxide particles enhances the interface between the positive electrode active material and a nonaqueous electrolytic solution. The interface may be enhanced particularly advantageously and higher output characteristics may be obtained when the first compound is a niobium compound, a zirconium compound or a titanium compound.

The second compound that is attached to the surface of the lithium transition metal oxide particles contains at least one element Mb selected from the group consisting of Group VI elements. This configuration is advantageous in that such a compound reacts with a lithium compound (a resistance component) present on the surface of the lithium transition metal oxide particles. When, in particular, the second compound is a tungsten compound or a molybdenum compound, the reaction with a lithium compound takes place favorably and thus enhanced output characteristics may be obtained.

Niobium is an example of preferred elements Ma. The niobium compounds are not particularly limited. Based on the fact that the niobium compounds are most stable when the oxidation number of niobium is 5 and also in order to prevent the positive electrode active material from containing impurities other than lithium and niobium, it is more preferable to use such compounds as $Nb_2O_5$, $LiNbO_3$, $LiNb_3O_8$, $Li_2Nb_8O_{21}$, $Li_3NbO_4$, $Li_7NbO_6$ and $Li_3Ni_2NbO_6$. Although the compounds containing elements Ma other than niobium (for example, any of Group IV elements and Group V elements such as titanium, zirconium and tantalum) are not particularly limited, it is more preferable to use compounds represented by $Li_lMa_mO_n$ in order to ensure that the element has the most stable oxidation number and no impurities other than lithium and the element Ma will be contained in the positive electrode active material. Here, l, m and n may be changed appropriately in accordance with the most stable oxidation number of Ma.

Tungsten is an example of preferred elements Mb. The tungsten compounds are not particularly limited. Based on the fact that the tungsten compounds are most stable when the oxidation number of tungsten is 6 and also in order to prevent the positive electrode active material from containing impurities other than lithium and tungsten, it is more preferable to use such compounds as $WO_3$ and $Li_2WO_4$. Although the compounds containing elements Mb other than tungsten (for example, any of Group VI elements such as molybdenum) are not particularly limited, it is more preferable to use compounds represented by $Li_pMb_qO_r$ in order to ensure that the element has the most stable oxidation number and no impurities other than lithium and the element Mb will be contained in the positive electrode active material. Here, p, q and r may be changed appropriately in accordance with the most stable oxidation number of Mb.

Preferably, the volume average primary particle diameter of the lithium transition metal oxide particles is 0.5 μm to 2 μm, and the volume average secondary particle diameter of the lithium transition metal oxide particles is 3 μm to 20 μm. If these particle diameters of the lithium transition metal oxide particles are excessively large, discharge performance is lowered. If, on the other hand, these particle diameters of the lithium transition metal oxide particles are excessively small, the reactivity with respect to nonaqueous electrolytic solutions is so increased that properties such as storage properties are decreased.

The volume average primary particle diameter may be obtained by direct observation with a scanning electron microscope (SEM). The volume average secondary particle diameter may be measured by laser diffractometry.

(1) The lithium transition metal oxide particles may be prepared by any method without limitation. For example, the particles may be prepared by mixing raw materials including a lithium compound and transition metal hydroxide or transition metal oxide particles, and calcining the mixture at an appropriate temperature. The type of the lithium compound is not particularly limited and, for example, lithium hydroxide or lithium carbonate may be used. The calcination temperature in the calcination of the raw materials is not necessarily specified and is variable depending on factors such as the composition and the particle size of the transition metal hydroxide or the transition metal oxide as the raw material. However, the calcination temperature is generally in the range of 500° C. to 1100° C., preferably in the range of 600° C. to 1000° C., and more preferably 700° C. to 900° C. The calcination step (the calcination step in the preparation of the lithium transition metal oxide particles) will be written as the primary calcination.

For example, one possible method for sintering the first compound containing the element Ma to the surface of the lithium transition metal oxide particles is to mix the primarily calcined lithium transition metal oxide particles with a prescribed amount of a precursor compound of the first compound by a method such as a Mechanofusion method to attach the first compound to a portion of the surface, and to thereafter subject the mixture to secondary calcination. When, for example, the first compound is a niobium compound, the heat treatment in this production method may cause the lithium transition metal oxide particles and the niobium compound to form at least one niobium compound selected from a Li—Nb—O compound and a Li—Ni—Nb—O compound.

In the secondary calcination of the lithium transition metal oxide particles and the precursor compound of the first compound attached to a portion of the surface of the particles, the calcination temperature is not necessarily specified and is variable depending on factors such as the composition of the transition metals, and the shape and the particle size of the positive electrode active material particles, as well as the type, the shape and the particle size of the first compound that has been added. However, the secondary calcination is performed at a temperature that is lower than the calcination temperature in the primary calcination and is generally in the range of 400° C. to 1000° C., and preferably in the range of 500° C. to 900° C. The calcination step (the calcination step in the sintering of the first compound to a portion of the surface of the lithium transition metal oxide particles) will be written as the secondary calcination.

The secondary calcination is performed at a temperature lower than the calcination temperature in the primary calcination. One reason for this is because if the secondary calcination is made at a temperature that is equal to or higher than the calcination temperature in the primary calcination, the compound that has been added is incorporated into the lithium transition metal oxide particles and the lithium transition metal oxide particles are consequently grown to such an extent that the sintering of the first compound produces a small effect in enhancing the interface between the positive electrode active material and a nonaqueous electrolytic solution, resulting in a decrease in output characteristics. If the secondary calcination temperature is less than 400° C., the reaction between the lithium transition metal oxide particles and the first compound does not take place appropriately. Consequently, the first compound, for example, a niobium compound such as niobium oxide, that has been attached to a portion of the surface of the lithium transition metal oxide particles remains as such on the portion of the surface of the positive electrode active material particles without forming a Li—Nb—O compound or a Li—Ni—Nb—O compound. Such modification fails to appropriately enhance the interface between the positive electrode active material and a nonaqueous electrolytic solution.

As described above, the lithium transition metal oxide particles and the precursor compound of the first compound attached to a portion of the surface of the particles are secondarily calcined at an appropriate temperature. When, for example, the precursor compound of the first compound is a niobium compound, such heat treatment results in appropriate sintering of a niobium compound such as a Li—Nb—O compound or a Li—Ni—Nb—O compound to the portion of the surface of the lithium transition metal oxide particles. This sintering may be confirmed by identifying the presence of particles of the niobium compound sintered to the portion of the surface of the lithium transition metal oxide particles with a scanning electron microscope (SEM). When the amount of the element Ma, for example niobium, contained in the first compound is approximately 0.5 mol % relative to the total amount of the transition metals in the positive electrode active material, a peak of the first compound may be observed by X-ray diffractometry (XRD).

The configuration of the first compound sintered to a portion of the surface of the lithium transition metal oxide particles may be analyzed by the following technique.

For example, the inside and the surface of the lithium transition metal oxide particle may be distinguished based on a difference in crystal structures using an analytical method such as electron beam diffraction or EXAFS.

After the first compound has been sintered to a portion of the surface of the lithium transition metal oxide particles as described above, the second compound is attached to a portion of the surface of the positive electrode active material particles. For example, a prescribed amount of the second compound containing the element Mb may be simply mixed with the lithium transition metal oxide particles having the first compound sintered to a portion of the surface thereof, or these materials may be mechanically mixed using Mechanofusion (manufactured by HOSOKAWA MICRON CORPORATION). This mixing step (the step in which the second compound is attached to a portion of the surface of the lithium transition metal oxide particles) will be written as the post-addition.

(2) The lithium transition metal oxide particles may contain manganese (Mn) or cobalt (Co) in addition to nickel (Ni), and may further contain at least one selected from the group consisting of boron (B), fluorine (F), magnesium (Mg), aluminum (Al), titanium (Ti), chromium (Cr), vanadium (V), iron (Fe), copper (Cu), zinc (Zn), niobium (Nb), molybdenum (Mo), tantalum (Ta), zirconium (Zr), tin (Sn), tungsten (W), sodium (Na), potassium (K), barium (Ba), strontium (Sr) and calcium (Ca).

(3) After the preparation of the lithium transition metal oxide particles, a compound or compounds containing any of boron (B), fluorine (F), magnesium (Mg), aluminum (Al), iron (Fe), copper (Cu), zinc (Zn), tin (Sn), sodium (Na), potassium (K), barium (Ba), strontium (Sr) and calcium (Ca) may be added and the mixture may be calcined at a temperature lower than the calcination temperature in the preparation of the lithium transition metal oxide particles, thereby sintering these compounds to a portion of the surface of the lithium transition metal oxide particles. Specifically, the calcination temperature is in the range of 400° C. to 1000° C., and preferably 500° C. to 900° C.

(4) The first compound is not limited to an oxide or a lithium transition metal oxide, and may be any of sodium transition metal oxides, potassium transition metal oxides, barium transition metal oxides, calcium transition metal oxides, magnesium transition metal oxides, cobalt transition metal oxides, fluorides, chlorides, bromides, iodides, nitrides, borides, carbides, silicides, aluminides, and mixtures of two or more of these materials. To prevent the positive electrode active material from containing impurities other than lithium and the element Ma, it is more preferable to use an impurity-free material such as an oxide or a lithium transition metal oxide.

(5) The second compound is not limited to an oxide or a lithium transition metal oxide, and may be any of sodium transition metal oxides, potassium transition metal oxides, barium transition metal oxides, calcium transition metal oxides, magnesium transition metal oxides, cobalt transition metal oxides, fluorides, chlorides, bromides, iodides, borides, nitrides, carbides, silicides, aluminides, and mixtures of two or more of these materials. To prevent the positive electrode active material from containing impurities other than lithium and the element Mb, it is more preferable to use an impurity-free material such as an oxide or a lithium transition metal oxide.

(6) If the amount of the first compound or the second compound is excessively small, the first compound or the second compound may fail to fully provide the advantageous effects described hereinabove. If, on the other hand, the amount of the first compound or the second compound is excessively large, the first compound or the second compound will cover a large proportion of the surface of the lithium transition metal oxide particles (an excessively large area will be covered) to cause a decrease in charge/discharge characteristics of the batteries. In light of these disadvantages, it is preferable that the amount of the element Ma of the first compound in the positive electrode active material [Element Ma present in first compound/(Element Ma present in first compound+Transition metal elements present in lithium transition metal oxide)] be controlled to 0.05 mol % to 10.00 mol %, in particular 0.10 mol % to 5.00 mol %, and especially 0.20 mol % to 1.5 mol %. Similarly for the second compound, the amount of the element Mb of the second compound in the positive electrode active material [Element Mb present in second compound/(Element Ma present in first compound+Transition metal elements present in lithium transition metal oxide)] is preferably controlled to 0.05 mol % to 10.00 mol %, in particular 0.10 mol % to 5.00 mol %, and especially 0.20 mol % to 1.5 mol %.

(7) The positive electrode active material is not limited to a single positive electrode active material in which the first compound is sintered to a portion of the surface of the lithium transition metal oxide particles and the second compound is attached to a portion of the surface of the lithium transition metal oxide particles. That is, such a positive electrode active material may be used as a mixture with an additional positive electrode active material. The additional positive electrode active materials are not particularly limited as long as lithium ions may be inserted and released reversibly. For example, it is possible to use positive electrode active materials having a layered structure capable of insertion and release of lithium ions while maintaining the stable crystal structure, or to use positive electrode active materials having a spinel structure or an olivine structure.

(8) As described hereinabove, the second compound is attached to a portion of the surface of the positive electrode active material particles having the first compound sintered thereto. This attachment may be obtained simply by mixing the second compound with the lithium transition metal oxide particles after the first compound has been sintered to a portion of the surface of the particles. However, the attaching method is not limited thereto and may be such that the second compound is simply mixed during a step of preparing a slurry of a positive electrode material mixture by kneading the positive electrode active material, a conductive agent and a binder, the positive electrode active material being obtained by the sintering of the first compound to a portion of the surface of the lithium transition metal oxide particles.

In the case where a method is adopted in which the second compound is mixed during the step of preparing a slurry of a positive electrode material mixture, the second compound may be present while being spaced apart from the surface of the lithium transition metal oxide particles. It is, however, considered that the majority of the second compound will be present on or near the surface of the lithium transition metal oxide particles. In the invention, the advantageous effects (the enhancement in output characteristics) may be obtained even when the second compound is not attached to the surface of the positive electrode active material particles, namely, even when the whole of the second compound is spaced apart from the surface of the lithium transition metal oxide particles. This is probably because the second compound still reacts with a residual lithium compound (a resistance component) present on the surface of the lithium transition metal oxide particles during the kneading of the slurry of a positive electrode material mixture to reduce the reaction resistance at the surface of the positive electrode active material particles. However, in order to sufficiently enhance output characteristics, in particular, output characteristics at low temperatures, it is preferable that the second compound be attached to the surface of the lithium transition metal oxide particles.

A nonaqueous electrolyte secondary battery having the aforementioned effects of the invention may be obtained even when a method is adopted in which the second compound is mixed during the step of preparing a slurry of a positive electrode material mixture. However, in order to sufficiently enhance output characteristics, in particular, output characteristics at low temperatures, direct mixing of the lithium transition metal oxide particles (the particles to which the first compound has been sintered) with the second compound is more preferable because this method allows for the second compound to be attached to the surface of the lithium transition metal oxide particles efficiently.

(9) Examples of the binders include polytetrafluoroethylene (PTFE), polyvinylidene fluoride, polyvinyl acetate, polymethacrylate, polyacrylate, polyacrylonitrile, polyvinyl alcohol and mixtures of two or more of these binders. The binders may be used in combination with thickeners such as carboxymethyl cellulose (CMC) and polyethylene oxide.

(10) Examples of the conductive agents include carbon materials such as carbon black, acetylene black, Ketjen black and graphite. These materials may be used singly, or two or more may be used in combination.

(11) Negative electrode active materials are not particularly limited as long as they are capable of reversible insertion and release of lithium ions. Examples include carbon materials, metal or alloy materials which may be alloyed with lithium, and metal oxides. From the viewpoint of material cost, the negative electrode active materials are preferably carbon materials such as natural graphite, artificial graphite, mesophase pitch carbon fibers (MCF), mesocarbon microbeads (MCMB), coke, hard carbon, fullerene and carbon nanotubes. In particular, carbon materials obtained by coating graphite materials with low-crystalline carbon are preferably used as the negative electrode active materials in order to enhance high-rate charge/discharge characteristics.

(12) The nonaqueous solvents used for the nonaqueous electrolytic solutions may be any of known nonaqueous solvents generally used in nonaqueous electrolyte secondary batteries. Examples include cyclic carbonates such as ethylene carbonate, propylene carbonate, butylene carbonate and vinylene carbonate, and chain carbonates such as dimethyl carbonate, methylethyl carbonate and diethyl carbonate. In particular, a mixed solvent of a cyclic carbonate and a chain carbonate is preferably used as the nonaqueous solvent because of its low viscosity, low melting point and high lithium ion conductivity. In such a mixed solvent, the volume ratio of the cyclic carbonate to the chain carbonate is preferably controlled to the range of 2:8 to 5:5.

Further, an ionic liquid may be used as the nonaqueous solvent in the nonaqueous electrolytic solution. In this case, the cationic species and the anionic species are not particularly limited. From the viewpoints of low viscosity, electrochemical stability and hydrophobicity, a combination of pyridinium cations, imidazolium cations or quaternary ammonium cations as the cations and fluorine-containing imide anions as the anions is particularly preferable.

(13) The solute in the nonaqueous electrolytic solution may be any of known lithium salts generally used in nonaqueous electrolyte secondary batteries. Examples of such lithium salts include those lithium salts containing one or more elements of phosphorus, boron, fluorine, oxygen, sulfur, nitrogen and chlorine. Specific examples include such lithium salts as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_6SO_2)_3$, $LiAsF_6$ and $LiClO_4$, and mixtures of these salts. In particular, $LiPF_6$ is preferably used in order to enhance high-rate charge/discharge characteristics and durability of the nonaqueous electrolyte secondary batteries. Further, the solute in the nonaqueous electrolytic solution may be a lithium salt having an oxalate complex as the anion. Examples of the lithium salts having an oxalate complex as the anion include LiBOB (lithium-bis-oxalato borate) and lithium salts in which $C_2O_4^{2-}$ is coordinated to the central metal of the anion, such as those represented by $Li[M(C_2O_4)_xR_y]$ (wherein M is an element selected from transition metals and elements in Groups IIIb, IVb and Vb of the periodic table, R is a group selected from halogens, alkyl groups and halogenated alkyl groups, x is a positive integer, and y is 0 or a positive integer). Specific examples include $Li[B(C_2O_4)F_2]$, $Li[P(C_2O_4)F_4]$ and $Li[P(C_2O_4)_2F_2]$. The use of LiBOB is most preferable in order to form stable films on the surface of the negative electrode even in a high-temperature environment.

(14) A separator may be disposed between the positive electrode and the negative electrode. Any materials may be used without limitation as long as the separators may prevent short circuits due to a contact between the positive electrode and the negative electrode and may be impregnated with the nonaqueous electrolytic solution to allow lithium ions to pass therethrough. Examples include polypropylene separators, polyethylene separators and polypropylene-polyethylene multilayer separators.

EXAMPLES

Hereinbelow, the present invention will be described based on detailed examples. However, the scope of the invention is not limited to the following examples, and appropriate modifications thereto are possible without departing from the spirit of the invention.

First Example

Example 1

First, $Li_2CO_3$ and $Ni_{0.5}Co_{0.2}Mn_{0.3}(OH)_2$ obtained by a coprecipitation method were mixed with each other in a prescribed ratio. The mixture was calcined in the air at 900° C. for 10 hours to give particles of a lithium transition metal oxide with a layered structure that was represented by $Li_{1.07}Ni_{0.46}Co_{0.19}Mn_{0.28}O_2$. The lithium transition metal oxide particles obtained had a volume average primary particle diameter of about 1 μm and a volume average secondary particle diameter of about 8 μm.

Next, the lithium transition metal oxide particles composed of $Li_{1.07}Ni_{0.46}Co_{0.19}Mn_{0.28}O_2$ and $Nb_2O_5$ having an average particle diameter of 150 nm were mixed with each other in a prescribed ratio. The mixture was secondarily calcined in the air at 700° C. for 1 hour to give lithium transition metal oxide particles in which the niobium compound was sintered to a portion of the surface of the lithium transition metal oxide particles. In the lithium transition metal oxide particles prepared as described above, the niobium content was 0.5 mol %. The niobium content was measured with an inductively coupled plasma (ICP) spectrometer. (The same applies hereinafter.)

Figure 3:
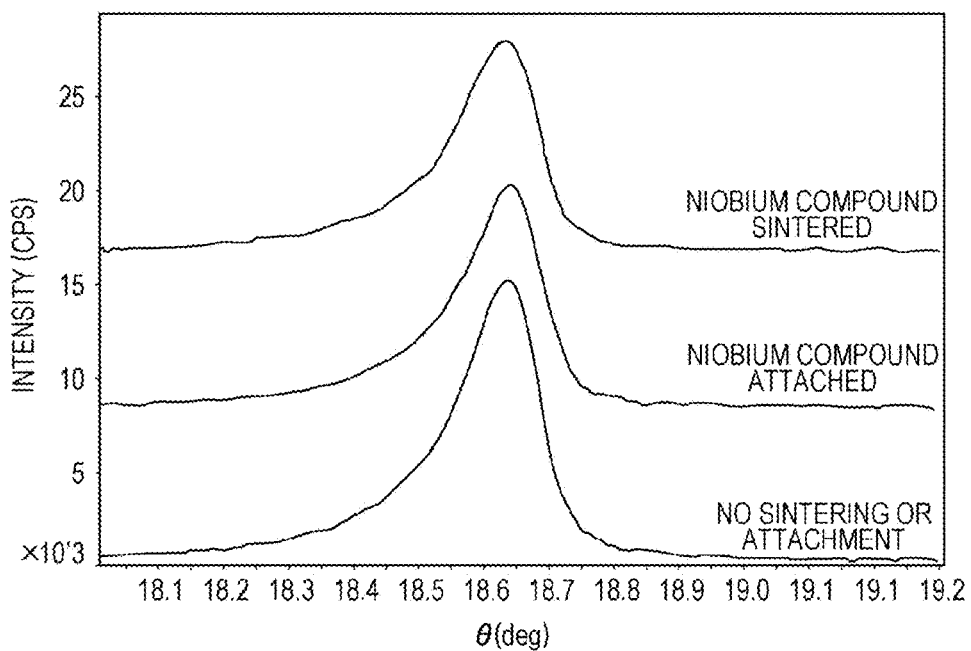
FIG. 3 is a view illustrating X-ray diffraction charts of lithium transition metal oxide particles having a niobium compound attached or sintered to the surface.
Figure 4:
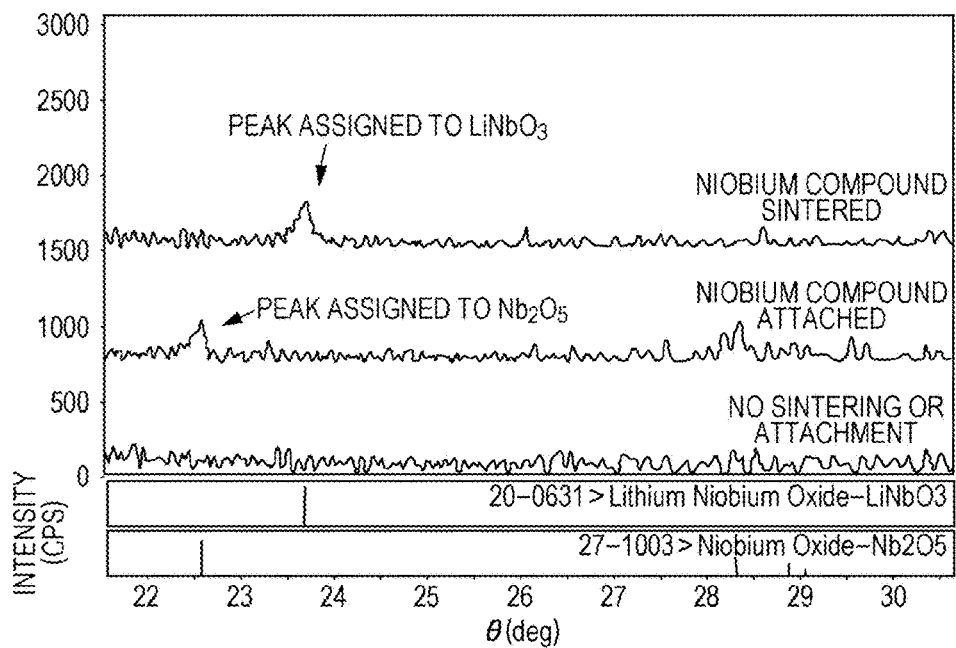
FIG. 4 is a view illustrating X-ray diffraction charts of lithium transition metal oxide particles having a niobium compound attached or sintered to the surface.

FIG. 3 and FIG. 4 are views illustrating X-ray diffraction charts of the lithium transition metal oxide particles before the attachment of the niobium (Nb) compound, the lithium transition metal oxide particles after the attachment of the niobium compound, and the lithium transition metal oxide particles after the sintering of the niobium compound by secondary calcination.

As illustrated in FIG. 3, the sintering of the niobium compound caused a peak assigned to (003) of the lithium transition metal oxide particles to shift toward the lower angle side as compared with the peak of the lithium transition metal oxide particles without any sintering or attachment of the niobium compound and the peak of the lithium transition metal oxide particles with the attachment of the niobium compound. Thus, it was shown that the niobium compound had been dissolved in the lithium transition metal oxide.

Further, as illustrated in FIG. 4, the secondary calcination resulted in the disappearance of a peak assigned to $Nb_2O_5$ that had been observed after the attachment of the niobium compound, and instead gave rise to a new peak assigned to $LiNbO_3$. Thus, it was shown that the niobium compound attached had been dissolved in the surface of the lithium transition metal oxide particles to form $LiNbO_3$.

Figure 5:
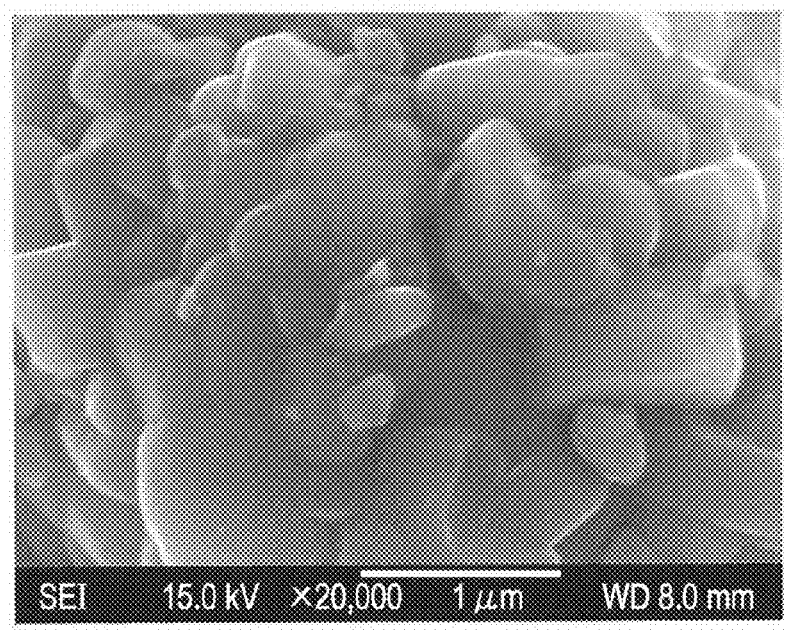
FIG. 5 is a view illustrating a scanning electron microscope (SEM) image of lithium transition metal oxide particles having a niobium compound attached to the surface.
Figure 6:
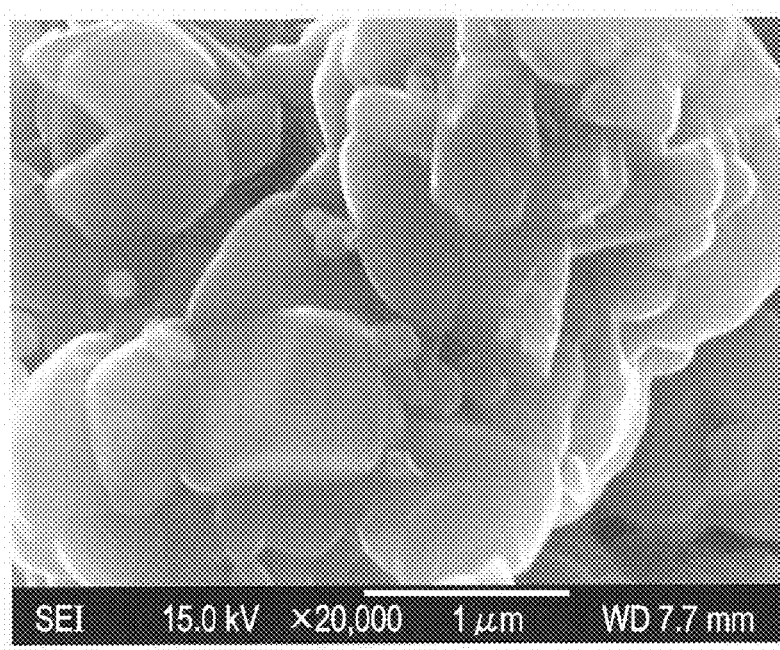
FIG. 6 is a view illustrating a scanning electron microscope (SEM) image of lithium transition metal oxide particles having a niobium compound sintered to the surface.

FIG. 5 is a view illustrating a scanning electron microscope (SEM) image of the lithium transition metal oxide particles with the attachment of the niobium compound. FIG. 6 is a view illustrating a scanning electron microscope (SEM) image of the lithium transition metal oxide particles after the sintering of the niobium compound by secondary calcination.

From the comparison between FIG. 5 and FIG. 6, it is observed that FIG. 5 illustrates the particles as being attached while FIG. 6 illustrates the attached particles as being bonded to the lithium transition metal oxide particles by forming a solid solution with the surface of the particles.

After the sintering of the niobium compound to a portion of the surface of the lithium transition metal oxide particles, the resultant particles of the lithium transition metal oxide ($Li_{1.07}Ni_{0.46}Co_{0.19}Mn_{0.28}O_2$) were mixed together with tungsten trioxide ($WO_3$) having an average particle diameter of 150 nm in a prescribed ratio. (This mixing step will be written as the post-addition step.) Consequently, a positive electrode active material was prepared in which the niobium compound was sintered to a portion of the surface of the lithium transition metal oxide particles and $WO_3$ was attached to a portion of the surface of the lithium transition metal oxide particles. In the positive electrode active material prepared as described above, the tungsten content was 0.5 mol %.

Next, the positive electrode active material, vapor grown carbon fibers (VGCF) as a conductive agent and an N-methyl-2-pyrrolidone solution of polyvinylidene fluoride as a binder were weighed in a positive electrode active material:conductive agent:binder mass ratio of 92:5:3. These materials were kneaded together to give a slurry of a positive electrode material mixture. Thereafter, the slurry of a positive electrode material mixture was applied to both sides of an aluminum foil as a positive electrode current collector. The wet films were dried and rolled with a roller. Further, a positive electrode current collector tab made of aluminum was mounted. A positive electrode was thus fabricated.

Figure 2:
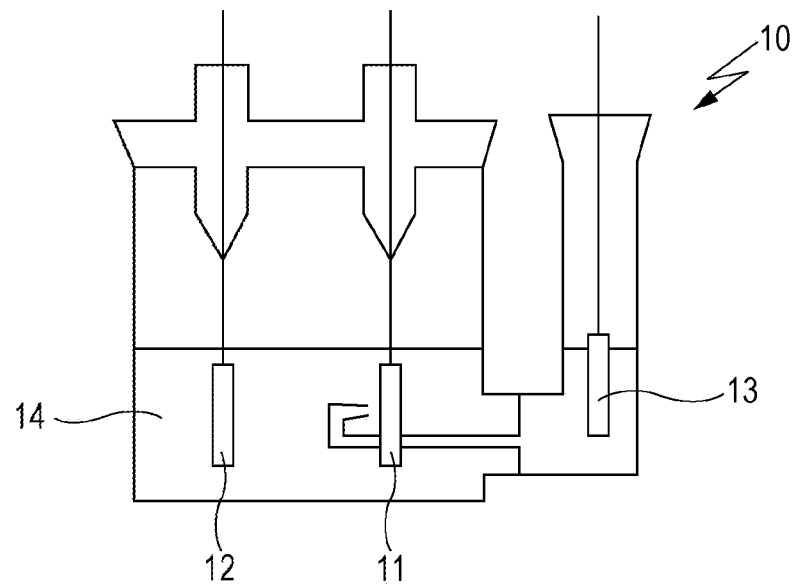
FIG. 2 is a schematic view illustrating a three-electrode test cell used in Examples of the present invention.

Further, as illustrated in FIG. 2, the positive electrode fabricated above was used as a working electrode 11, while metallic lithium was used for a counter electrode 12 serving as a negative electrode and also for a reference electrode 13. A nonaqueous electrolytic solution 14 that was used was a solution of 1 mol/L $LiPF_6$ and 1 mass % vinylene carbonate in a mixed solvent containing ethylene carbonate, methylethyl carbonate and dimethyl carbonate in a volume ratio of 3:3:4. Thus, a three-electrode test cell 10 was fabricated.

The test cell prepared above will be written as the cell A1 hereinbelow.

Example 2

A test cell was fabricated in the same manner as in EXAMPLE 1, except that the positive electrode active material was prepared using $ZrO_2$ with an average particle diameter of 150 nm in place of $Nb_2O_5$ during the secondary calcination (the zirconium compound was sintered to a portion of the surface of the lithium transition metal oxide). Specifically, the positive electrode active material prepared was such that the zirconium compound was sintered to a portion of the surface of the lithium transition metal oxide particles and $WO_3$ was attached to a portion of the surface of the lithium transition metal oxide. In the positive electrode active material prepared as described above, the zirconium content and the tungsten content were each 0.5 mol %. The cell prepared above will be written as the cell A2.

Example 3

A test cell was fabricated in the same manner as in EXAMPLE 2, except that the positive electrode active material was prepared using $MoO_3$ with an average particle diameter of 150 nm in place of tungsten trioxide ($WO_3$) during the post-addition (the molybdenum compound was attached to a portion of the surface of the lithium transition metal oxide). Specifically, the positive electrode active material prepared was such that the zirconium compound was sintered to a portion of the surface of the lithium transition metal oxide particles and $MoO_3$ was attached to a portion of the surface of the lithium transition metal oxide. In the positive electrode active material prepared as described above, the zirconium content and the molybdenum content were each 0.5 mol %. The cell prepared above will be written as the cell A3.

Example 4

A test cell was fabricated in the same manner as in EXAMPLE 1, except that the positive electrode active material was prepared using $TiO_2$ with an average particle diameter of 100 nm in place of $Nb_2O_5$ during the secondary calcination (the titanium compound was sintered to a portion of the surface of the lithium transition metal oxide). Specifically, the positive electrode active material prepared was such that the titanium compound was sintered to a portion of the surface of the lithium transition metal oxide particles and $WO_3$ was attached to a portion of the surface of the lithium transition metal oxide. In the positive electrode active material prepared as described above, the titanium content and the tungsten content were each 0.5 mol %. The cell prepared above will be written as the cell A4.

Comparative Example 1

A test cell was fabricated in the same manner as in EXAMPLE 1, except that the positive electrode active material was prepared without adding $Nb_2O_5$ during the secondary calcination (without sintering the niobium compound to a portion of the surface of the lithium transition metal oxide particles) and without adding $WO_3$ during the post-addition (without attaching the tungsten compound to a portion of the surface of the lithium transition metal oxide particles). Specifically, the lithium transition metal oxide particles were used directly as the positive electrode active material. The cell prepared above will be written as the cell B1.

Comparative Example 2

A test cell was fabricated in the same manner as in COMPARATIVE EXAMPLE 1, except that the positive electrode active material was prepared using $Nb_2O_5$ during the secondary calcination (the niobium compound was sintered to a portion of the surface of the lithium transition metal oxide particles). Specifically, the positive electrode active material prepared was such that only the niobium compound was sintered to a portion of the surface of the lithium transition metal oxide particles. In the positive electrode active material, the niobium content was 0.5 mol %. The cell prepared above will be written as the cell B2.

Comparative Example 3

A test cell was fabricated in the same manner as in COMPARATIVE EXAMPLE 1, except that the positive electrode active material was prepared using $Nb_2O_5$ during the post-addition (the niobium compound was attached to a portion of the surface of the lithium transition metal oxide particles). Specifically, the positive electrode active material prepared was such that only the niobium compound was attached to a portion of the surface of the lithium transition metal oxide particles. In the positive electrode active material, the niobium content was 1.0 mol %. The cell prepared above will be written as the cell B3.

Comparative Example 4

A test cell was fabricated in the same manner as in COMPARATIVE EXAMPLE 1, except that the positive electrode active material was prepared using $WO_3$ during the secondary calcination (the tungsten compound was sintered to a portion of the surface of the lithium transition metal oxide particles). Specifically, the positive electrode active material prepared was such that only the tungsten compound was sintered to a portion of the surface of the lithium transition metal oxide particles. In the positive electrode active material, the tungsten content was 0.5 mol %. The cell prepared above will be written as the cell B4.

Comparative Example 5

A test cell was fabricated in the same manner as in COMPARATIVE EXAMPLE 1, except that the positive electrode active material was prepared using $WO_3$ during the post-addition (the tungsten compound was attached to a portion of the surface of the lithium transition metal oxide particles). Specifically, the positive electrode active material prepared was such that only the tungsten compound was attached to a portion of the surface of the lithium transition metal oxide particles. In the positive electrode active material, the tungsten content was 1.0 mol %. The cell prepared above will be written as the cell B5.

Comparative Example 6

A test cell was fabricated in the same manner as in COMPARATIVE EXAMPLE 1, except that the positive electrode active material was prepared using $ZrO_2$ during the secondary calcination (the zirconium compound was sintered to a portion of the surface of the lithium transition metal oxide particles). Specifically, the positive electrode active material prepared was such that only the zirconium compound was sintered to a portion of the surface of the lithium transition metal oxide particles. In the positive electrode active material, the zirconium content was 0.5 mol %. The cell prepared above will be written as the cell B6.

Comparative Example 7

A test cell was fabricated in the same manner as in COMPARATIVE EXAMPLE 1, except that the positive electrode active material was prepared using $TiO_2$ during the secondary calcination (the titanium compound was sintered to a portion of the surface of the lithium transition metal oxide particles). Specifically, the positive electrode active material prepared was such that only the titanium compound was sintered to a portion of the surface of the lithium transition metal oxide particles. In the positive electrode active material, the titanium content was 0.5 mol %. The cell prepared above will be written as the cell B7.

(Experiments)

At a temperature of 25° C., the cells A1 to A4 and B1 to B7 were charged at a constant current density of 0.2 mA/cm² to a voltage of 4.3 V (vs. Li/Li⁺) and were charged at a constant voltage of 4.3 V (vs. Li/Li⁺) to a current density of 0.04 mA/cm². Thereafter, the cells were discharged at a constant current density of 0.2 mA/cm² to a voltage of 2.5 V (vs. Li/Li⁺). The discharge capacities measured during the discharging were obtained as the rated capacities of the three-electrode test cells.

Next, the cells A1 to A4 and B1 to B7 were charged at a current density of 0.2 mA/cm² to 50% of the respective rated capacities (namely, until the state of charge (SOC) reached 50%). Thereafter, the cells A1 to A4 and B1 to B7 were discharged at a temperature of −30° C. and their outputs were measured. The results are described in Table 1.

In Table 1, the output characteristics of the cells A1 to A4 and B1 to B7 are shown as values relative to the SOC 50% output of the cell B1 at −30° C. taken as 100.

TABLE 1

| | | Positive electrode active material | | | | | SOC 50% |
|---|---|---|---|---|---|---|---|
| | | | First compound | | Second compound | | |
| Cell | Lithium transition metal oxide | | Element | Amount added (mol %) | Element | Amount added (mol %) | Output characteristics −30° C. |
| A1 | $Li_{1.07}Ni_{0.46}Co_{0.19}Mn_{0.28}O_2$ | | Nb | 0.5 | W | 0.5 | 163 |
| A2 | | | Zr | 0.5 | W | 0.5 | 150 |
| A3 | | | Zr | 0.5 | Mo | 0.5 | 145 |
| A4 | | | Ti | 0.5 | W | 0.5 | 156 |
| B1 | | | — | — | — | — | 100 |
| B2 | | | Nb | 0.5 | — | — | 132 |
| B3 | | | — | — | Nb | 1 | 93 |
| B4 | | | W | 0.5 | — | — | 102 |
| B5 | | | — | — | W | 1 | 113 |
| B6 | | | Zr | 0.5 | — | — | 125 |
| B7 | | | Ti | 0.5 | — | — | 119 |

As shown in Table 1, the cell A1 which involved the positive electrode active material in which the niobium compound was sintered to a portion of the surface of the lithium transition metal oxide particles represented by $Li_{1.07}Ni_{0.46}Co_{0.19}Mn_{0.28}O_2$ and the tungsten compound was attached to a portion of the surface of the lithium transition metal oxide particles achieved a marked enhancement in output characteristics compared to the cell B1 without any surface treatment (the sintering or attachment of any compound) on the lithium transition metal oxide particles. Further, a significant enhancement in output characteristics was obtained over the cells B2 and B5 which used the positive electrode active material having a structure in which the niobium compound was sintered or the tungsten compound was attached to a portion of the surface of the lithium transition metal oxide particles. Similarly, the cells A2 and A4 which involved the positive electrode active material in which the zirconium compound or the titanium compound was sintered to a portion of the surface of the lithium transition metal oxide particles and the tungsten compound was attached to a portion of the surface of the lithium transition metal oxide particles achieved a marked enhancement in output characteristics compared to the cell B1 without any surface treatment (the sintering or attachment of any compound) on the lithium transition metal oxide particles. Further, a significant enhancement in output characteristics was obtained over the cells B6 and B7 having a structure in which the zirconium compound or the titanium compound was sintered to a portion of the surface of the lithium transition metal oxide particles. Further, the cell A3 which involved the positive electrode active material in which the zirconium compound was sintered to a portion of the surface of the lithium transition metal oxide particles and the molybdenum compound was attached to a portion of the surface of the lithium transition metal oxide particles achieved a marked enhancement in output characteristics compared to the cell B1 without any surface treatment (the sintering or attachment of any compound) on the lithium transition metal oxide particles. Further, it was demonstrated that the output characteristics were not substantially enhanced in the case of the cells B3 and B4 which used the positive electrode active material in which the tungsten compound was sintered or the niobium compound was attached to a portion of the surface of the lithium transition metal oxide particles.

As demonstrated above, the output characteristics were enhanced by the modification in which the first compound was sintered to a portion of the surface of the lithium transition metal oxide particles and the second compound was attached to a portion of the surface of the lithium transition metal oxide particles. Detailed reasons for this enhancement are not clear but may be probably explained as follows.

When the first compound, for example, a niobium compound (at least one niobium compound selected from a Li—Nb—O compound and a Li—Ni—Nb—O compound) is sintered to a portion of the surface of the lithium transition metal oxide particles, the sintered niobium compound enhances the interface between the positive electrode active material and a nonaqueous electrolytic solution, and this modification probably promotes the charge transfer reaction. It is considered that a similar effect will be obtained by the use of other types of the first compounds containing the element Ma (compounds containing a Group IV or Group V element).

When the second compound, for example, a tungsten compound is attached to a portion of the surface of the lithium transition metal oxide particles, the second compound reduces the reaction resistance at the surface of the positive electrode active material particles by reacting with a residual lithium compound (a resistance component) present on the surface of the particles. This is probably the reason why the charge transfer reaction at the interface between the positive electrode active material particles and an electrolytic solution is promoted. It is considered that a similar effect will be obtained by the use of other types of the second compounds containing the element Mb (oxides containing at least one element Mb selected from the group consisting of Group VI elements).

The sintering of the first compound to a portion of the surface of the lithium transition metal oxide particles enhances the interface between the positive electrode active material and a nonaqueous electrolytic solution. A lithium compound (a resistance component) formed on the surface of the particles during this modification is removed by the reaction with the second compound that is attached to the particle surface. The output characteristics are specifically enhanced probably by this mechanism.

On the other hand, no enhancement in output characteristics was obtained when the first compound was attached to a portion of the surface of the lithium transition metal oxide particles as demonstrated by the cell B3. Detailed reasons for this failure are not clear but may be probably explained as follows. In the case where the first compound is attached to a portion of the surface of the lithium transition metal oxide particles, the first compound is not diffused into the surface of the lithium transition metal oxide particles and thus fails to enhance the interface between the positive electrode active material and a nonaqueous electrolytic solution. Further, the first compound has a low reactivity with respect to a residual lithium compound (a resistance component) present on the surface of the particles and consequently the resistance component cannot be removed. This is probably the reason why no effects were obtained in enhancing the output characteristics. Further, any enhancement in output characteristics was not obtained when the second compound was sintered to a portion of the surface of the lithium transition metal oxide particles as demonstrated by the cell B4. The reason for this is probably as follows. In the case where the second compound is sintered to the surface of the lithium transition metal oxide particles, the second compound may be diffused into the surface of the lithium transition metal oxide particles but produces no effect in decreasing the charge transfer resistance at the interface between the positive electrode active material and an electrolytic solution. Further, when the second compound is sintered, the heating results in the reformation of a resistance lithium component on the surface of the lithium transition metal oxide. Probably because of this, no effects were obtained in the enhancement of output characteristics in contrast to when the second compound was attached.

Second Example

Example 5

A test cell was fabricated in the same manner as the cell A2 produced in EXAMPLE 2, except that the tungsten compound was added during the step in which the positive electrode active material, vapor grown carbon fibers (VGCF) as a conductive agent and an N-methyl-2-pyrrolidone solution of polyvinylidene fluoride as a binder were kneaded together to give a slurry of a positive electrode material mixture. The tungsten content in the positive electrode was 0.5 mol %. The cell prepared above will be written as the cell A5.

(Experiments)

At a temperature of 25° C., the cells A2 and A5 were charged at a constant current density of 0.2 mA/cm$^2$ to a voltage of 4.3 V (vs. Li/Li$^+$) and were charged at a constant voltage of 4.3 V (vs. Li/Li$^+$) to a current density of 0.04 mA/cm$^2$. Thereafter, the cells were discharged at a constant current density of 0.2 mA/cm$^2$ to a voltage of 2.5 V (vs. Li/Li$^+$). The discharge capacities measured during the discharging were obtained as the rated capacities of the three-electrode test cells.

Next, the cells A2 and A5 were charged at a current density of 0.2 mA/cm$^2$ to 50% of the respective rated capacities (namely, until the state of charge (SOC) reached 50%). Thereafter, the cells A2 and A5 were discharged at a temperature of −30° C. and their outputs were measured. The results are described in Table 2.

In Table 2, the output characteristics of the cells A2 and A5 are shown as values relative to the SOC 50% output of the cell B1 of COMPARATIVE EXAMPLE 1 in FIRST EXAMPLE at −30° C. taken as 100.

TABLE 2

| | Positive electrode active material | | | | | SOC 50% |
|---|---|---|---|---|---|---|
| | | First compound | | Second compound | | |
| Cell | Lithium transition metal oxide | Element | Amount added (mol %) | Element | Amount added (mol %) | Mode of addition | Output characteristics $-30°$ C. |
| A2 | $Li_{1.07}Ni_{0.46}Co_{0.19}Mn_{0.28}O_2$ | Zr | 0.5 | W | 0.5 | Added to active material | 150 |
| A5 | | Zr | 0.5 | W | 0.5 | Added to slurry | 145 |

As shown in Table 2, the cell A5 fabricated in such a manner that the tungsten compound was mixed during the step of preparation of the slurry of a positive electrode material mixture achieved a marked enhancement in output characteristics similarly to the cell A2 fabricated by mixing the tungsten compound directly with the lithium transition metal oxide particles (to which the zirconium compound had been sintered). That is, the cell A5 was demonstrated to provide the advantageous effect according to the present invention. The reason for the higher output characteristics of the cell A2 over the cell A5 is probably because the direct mixing of the tungsten compound with the lithium transition metal oxide particles allowed the second compound to react with the residual lithium compound (the resistance component) on the particle surface more effectively and consequently the reaction resistance at the surface of the positive electrode active material particles was decreased to a greater extent.

REFERENCE SIGNS LIST

1 . . . LITHIUM TRANSITION METAL OXIDE PARTICLE
2 . . . FIRST COMPOUND
3 . . . SECOND COMPOUND
4 . . . SURFACE SOLID SOLUTION PORTION
5 . . . PARTICLE SURFACE PORTION
10 . . . THREE-ELECTRODE TEST CELL
11 . . . WORKING ELECTRODE (POSITIVE ELECTRODE)
12 . . . COUNTER ELECTRODE (NEGATIVE ELECTRODE)
13 . . . REFERENCE ELECTRODE
14 . . . NONAQUEOUS ELECTROLYTIC SOLUTION

The invention claimed is:

1. A nonaqueous electrolyte secondary battery comprising a positive electrode, a negative electrode and a nonaqueous electrolyte,
the positive electrode including lithium transition metal oxide particles as a positive electrode active material, the lithium transition metal oxide particles containing nickel as a main transition metal component,
the lithium transition metal oxide particles being such that a first compound containing at least one element Ma selected from the group consisting of Group IV elements and Group V elements except for titanium is sintered to a portion of the surface of the lithium transition metal oxide particles, the first compound having a composition different from that of the lithium transition metal oxide particles, and
the positive electrode further including a second compound particle containing $Li_2WO_4$,
wherein an amount of the $Li_2WO_4$ in the positive electrode active material, $Li_2WO_4$ presented in the second compound/(element Ma present in the first compound+ transition metal elements present in lithium transition metal oxide), is in a range of 0.05 mol % to 1.5 mol %,
wherein the second compound particle is mixed into the positive electrode,
wherein the second compound particle has a composition different from that of the lithium transition metal oxide particles, and
wherein the second compound particle containing $Li_2WO_4$ is not dissolved in the surface of the lithium transition metal oxide particles, and/or is not diffused into the lithium transition metal oxide particles.

2. The nonaqueous electrolyte secondary battery according to claim 1, wherein the second compound particle is attached to a portion of the surface of the lithium transition metal oxide particles.

3. The nonaqueous electrolyte secondary battery according to claim 1, wherein the element Ma includes zirconium.

4. The nonaqueous electrolyte secondary battery according to claim 1, wherein the transition metals in the lithium transition metal oxide particles include manganese and/or cobalt in addition to nickel.

5. The nonaqueous electrolyte secondary battery according to claim 4, wherein the lithium transition metal oxide particles are an oxide represented by the general formula $Li_{1+x}Ni_aMn_bCo_cO_{2+d}$ (wherein x, a, b, c and d satisfy $x+a+b+=1$, $0<x\leq0.2$, $a\geq b$, $a\geq c$, $0<c/(a+b)<0.65$, $1.0\leq a/b\leq3.0$ and $-0.1\leq d\leq0.1$).

6. The nonaqueous electrolyte secondary battery according to claim 1, wherein the first compound and/or the second compound particle is an oxide.

7. The nonaqueous electrolyte secondary battery according to claim 1, wherein the volume average primary particle diameter of the lithium transition metal oxide particles is 0.5 μm to 2 μm, and the volume average secondary particle diameter of the lithium transition metal oxide particles is 3 μm to 20 μm.

8. The nonaqueous electrolyte secondary battery according to claim 1, wherein the second compound particle is mixed together with the lithium transition metal oxide particle such that the second compound particle is attached or in the vicinity of a surface of the lithium transition metal oxide particle.

9. The nonaqueous electrolyte secondary battery according to claim wherein the element Ma includes niobium.

10. A positive electrode active material for nonaqueous electrolyte secondary batteries, comprising:
lithium transition metal oxide particles containing nickel as a main transition metal component, a first compound having a composition different from that of the lithium transition metal oxide particles and being sintered to a portion of the surface of the lithium transition metal oxide particles, wherein the first compound contains at least one element Ma selected from the group consisting of Group IV elements and Group V elements except for titanium, and a second compound particle containing $Li_2WO_4$, wherein an amount of the $Li_2WO_4$ in the positive electrode active material, $Li_2WO_4$ presented in the second compound/(element Ma present in the first compound+transition metal elements present in lithium transition metal oxide), is in a range of 0.05 mol % to 1.5 mol %, wherein the second compound particle is mixed into the positive electrode, wherein the second compound particle has a composition different from that of the lithium transition metal oxide particles, and wherein the second compound particle containing $Li_2WO_4$ is not dissolved in the surface of the lithium transition metal oxide particles, and/or is not diffused into the lithium transition metal oxide.

11. The positive electrode active material for nonaqueous electrolyte secondary batteries according to claim 10, wherein the element Ma includes zirconium.

12. The positive electrode active material for nonaqueous electrolyte secondary batteries according to claim 10, wherein the element Ma includes niobium.

\* \* \* \* \*